(12) United States Patent
Jung et al.

(10) Patent No.: US 9,128,563 B2
(45) Date of Patent: Sep. 8, 2015

(54) DISPLAY DEVICE AND MANUFACTURING METHOD THEREOF

(75) Inventors: Suk Won Jung, Goyang-si (KR); Sung Hoon Yang, Seoul (KR); Sang-Youn Han, Seoul (KR); Seung Mi Seo, Hwaseong-si (KR); Mi-Seon Seo, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 13/366,683

(22) Filed: Feb. 6, 2012

(65) Prior Publication Data

US 2013/0056732 A1   Mar. 7, 2013

(30) Foreign Application Priority Data

Sep. 7, 2011  (KR) .................. 10-2011-0090616

(51) Int. Cl.
- *H01L 29/04* (2006.01)
- *H01L 29/10* (2006.01)
- *H01L 31/00* (2006.01)
- *G06F 3/042* (2006.01)
- *G06F 3/041* (2006.01)
- *G02F 1/1333* (2006.01)

(52) U.S. Cl.
CPC .............. *G06F 3/042* (2013.01); *G06F 3/0412* (2013.01); *G02F 1/13338* (2013.01)

(58) Field of Classification Search
CPC .................................................. H01L 31/0376
USPC ............ 257/43, 57, 59, 60; 349/141; 438/30, 438/48, 149, 152
See application file for complete search history.

(56) References Cited

U.S. PATENT DOCUMENTS

| | | | | |
|---|---|---|---|---|
| 4,723,838 A | * | 2/1988 | Aoki et al. | 349/47 |
| 5,594,248 A | * | 1/1997 | Tanaka | 250/332 |
| 5,811,318 A | * | 9/1998 | Kweon | 438/30 |
| 5,838,399 A | * | 11/1998 | Someya et al. | 349/46 |
| 5,851,440 A | * | 12/1998 | Tanaka et al. | 257/66 |
| 6,262,438 B1 | | 7/2001 | Yamazaki et al. | |
| 6,524,876 B1 | * | 2/2003 | Baek et al. | 438/48 |
| 6,812,912 B2 | | 11/2004 | Miyajima et al. | |

(Continued)

FOREIGN PATENT DOCUMENTS

| KR | 1020080059903 | 7/2008 |
|---|---|---|
| KR | 1020100115302 | 10/2010 |

(Continued)

*Primary Examiner* — Shaun Campbell
*Assistant Examiner* — Ismail Muse
(74) *Attorney, Agent, or Firm* — Cantor Colburn LLP (57) ABSTRACT

A display device includes: a substrate; an infrared sensing transistor on the substrate; a readout transistor connected to the infrared sensing transistor; a power source line; and a light blocking member on the infrared sensing transistor, where the infrared sensing transistor includes a light blocking film on the substrate, a first gate electrode contacting and overlapping the light blocking film and connected to a power source line, a first semiconductor layer on the first gate electrode overlapping the light blocking film, and first source and drain electrodes on the first semiconductor layer, where the readout transistor includes a second gate electrode on the substrate, a second semiconductor layer on the second gate electrode and overlapping the second gate electrode, and second source and drain electrodes the second semiconductor layer, and where the power source line and the first gate electrode are at a same layer.

26 Claims, 9 Drawing Sheets

(56) References Cited

U.S. PATENT DOCUMENTS

| | | |
|---|---|---|
| 6,949,391 B2 | 9/2005 | You |
| RE39,211 E * | 8/2006 | Kweon ............................ 257/72 |
| 7,738,019 B2 * | 6/2010 | Misek ............................ 348/297 |
| 2005/0139751 A1 * | 6/2005 | Park et al. .................... 250/208.1 |
| 2006/0125971 A1 * | 6/2006 | Abileah et al. ................. 349/42 |
| 2008/0088716 A1 * | 4/2008 | Misek ......................... 348/229.1 |
| 2009/0039353 A1 * | 2/2009 | Jun et al. ......................... 257/72 |
| 2009/0101906 A1 * | 4/2009 | Hosoya et al. .................. 257/59 |
| 2009/0200088 A1 * | 8/2009 | Chuang ...................... 178/18.01 |
| 2009/0212288 A1 * | 8/2009 | Kim et al. ....................... 257/57 |
| 2009/0256984 A1 * | 10/2009 | Lee et al. ........................ 349/43 |
| 2009/0261333 A1 * | 10/2009 | Chang et al. .................... 257/59 |
| 2009/0291236 A1 * | 11/2009 | Sasada et al. ................... 428/1.1 |
| 2010/0264410 A1 | 10/2010 | Nomoto et al. |
| 2011/0012115 A1 * | 1/2011 | Jeon et al. ........................ 257/59 |
| 2011/0057189 A1 * | 3/2011 | Jeong et al. ..................... 257/59 |
| 2011/0109609 A1 * | 5/2011 | Jeong et al. .................... 345/211 |
| 2012/0162126 A1 * | 6/2012 | Yuan et al. ..................... 345/174 |

FOREIGN PATENT DOCUMENTS

| | | |
|---|---|---|
| KR | 1020110014478 | 2/2011 |
| KR | 1020110026764 | 3/2011 |
| KR | 101032064 | 4/2011 |

* cited by examiner

DISPLAY DEVICE AND MANUFACTURING METHOD THEREOF

This application claims priority to Korean Patent Application No. 10-2011-0090616 filed on Sep. 7, 2011, and all the benefits accruing therefrom under 35 U.S.C. §119, the content of which in its entirety is herein incorporated by reference.

BACKGROUND OF THE INVENTION (a) Field of the Invention

Exemplary embodiments of the invention relate to a display device and a manufacturing method of the display device.

(b) Description of the Related Art

A liquid crystal display, which is one of the most widely used types of flat panel display, typically includes two display panels, on which field generating electrodes, such as a pixel electrode and a common electrode, are formed, and a liquid crystal layer interposing between the two display panels. The liquid crystal display displays an image by applying a voltage to the field generating electrodes to generate an electric field in the liquid crystal layer, thereby determining the direction of liquid crystal molecules of the liquid crystal layer, and controlling the polarization of incident light.

Recently, a liquid crystal display including a touch sensing function or an image sensing function has been actively researched. However, a conventional sensing device typically performs the sensing function or the image sensing function based on physical changes such that high reliability may not be effectively obtained. Particularly, when visible light and infrared rays are simultaneously used to execute the sensing function, the infrared sensing function may be deteriorated by the visible light. In Korean Patent Publication Number 10-2011-0026764, a structure forming a light blocking film that effectively prevents the infrared sensing function from being deteriorated by the visible light is disclosed; however, the number of masks used in the manufacturing process is substantially increased such that the manufactured cost is increased.

BRIEF SUMMARY OF THE INVENTION

Exemplary embodiments of the invention provide a display device manufactured by a simplified process and a manufacturing method thereof.

In an exemplary embodiment, a display device includes: a first substrate; an infrared sensing transistor disposed on the first substrate; a readout transistor connected to the infrared sensing transistor and which transmits a detecting signal; and a light blocking member disposed on the infrared sensing transistor, where the infrared sensing transistor includes a light blocking film disposed on the first substrate, a first gate electrode contacting the light blocking film and disposed on the light blocking film, a first semiconductor layer disposed on the first gate electrode overlapping the light blocking film, a first source electrode disposed on the first semiconductor layer and a first drain electrode disposed on the first semiconductor layer, where the readout transistor includes a second gate electrode disposed on the first substrate, a second semiconductor layer disposed on the second gate electrode and overlapping the second gate electrode, a second source electrode disposed on the second semiconductor layer and a second drain electrode disposed on the second semiconductor layer, where the first gate electrode is connected to a power source line, where the power source line and the first gate electrode are disposed at a same layer, and where the light blocking member overlaps the first semiconductor layer.

In an exemplary embodiment, a storage capacitor may be defined by the first gate electrode and the first drain electrode overlapping each other, and the storage capacitor may store a leakage current generated in the first semiconductor layer.

In an exemplary embodiment, the first drain electrode may be connected to the second drain electrode.

In an exemplary embodiment, the display device may include a gate line connected to the second gate electrode.

In an exemplary embodiment, the power source line and the gate line may be disposed in the same layer.

In an exemplary embodiment, the power source line may apply a negative bias voltage to the first gate electrode.

In an exemplary embodiment, each of the first semiconductor layer and the second semiconductor layer may include a first layer including amorphous silicon and a second layer including amorphous silicon germanium and disposed on the first layer.

In an exemplary embodiment, the first semiconductor layer and the second semiconductor layer may be disposed at a same layer.

In an exemplary embodiment, the display device may further include a source signal line connected to the first source.

In an exemplary embodiment, the display device may further include a readout signal line connected to the second gate electrode.

In an exemplary embodiment, the display device may further include an operational amplifier connected to the readout signal line.

In an exemplary embodiment, the light blocking film may include amorphous silicon germanium.

In an exemplary embodiment, the light blocking member may have infrared ray transmittance less than about 0.1%.

In an exemplary embodiment, the light blocking member may have optical density greater than about 4.

In an exemplary embodiment, the display device may further include a second substrate disposed opposite to the first substrate and a pixel transistor disposed on the second substrate.

In an exemplary embodiment, a method manufacturing a display device includes: forming a light blocking film on a first substrate; forming a power source line including a first gate electrode contacting the light blocking film and a gate line including a second gate electrode on the first substrate; forming a gate insulating layer covering the first gate electrode, the second gate electrode, the power source line and the gate line; forming a first semiconductor layer corresponding to the first gate electrode and forming a second semiconductor layer corresponding to the second gate electrode on the gate insulating layer; forming a first source electrode and a first drain electrode facing each other on the first semiconductor layer, forming a second source electrode and a second drain electrode facing each other on the second semiconductor layer, forming a source signal line connected to the first source electrode, and forming a readout signal line connected to the second source electrode; forming a passivation layer covering the first source electrode, the first drain electrode, the second source electrode and the second drain electrode; and forming a light blocking member on the passivation layer and overlapping the first semiconductor layer.

In an exemplary embodiment, the first drain electrode may be connected to the second drain electrode.

In an exemplary embodiment, the gate line and the power source line may be formed at a same layer.

In an exemplary embodiment, the first semiconductor layer and the second semiconductor layer may be formed by sequentially depositing a first layer including amorphous silicon and a second layer including amorphous silicon germanium.

In an exemplary embodiment, the first semiconductor layer and the second semiconductor layer may be formed at a same process.

According to an exemplary embodiment of the invention, a top gate typically used to block the light incident to the infrared sensing transistor from a backlight is replaced with the light blocking member and the semiconductor layer having a double-layered structure such that the manufacturing process is substantially simplified.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF THE INVENTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

Figure 1:
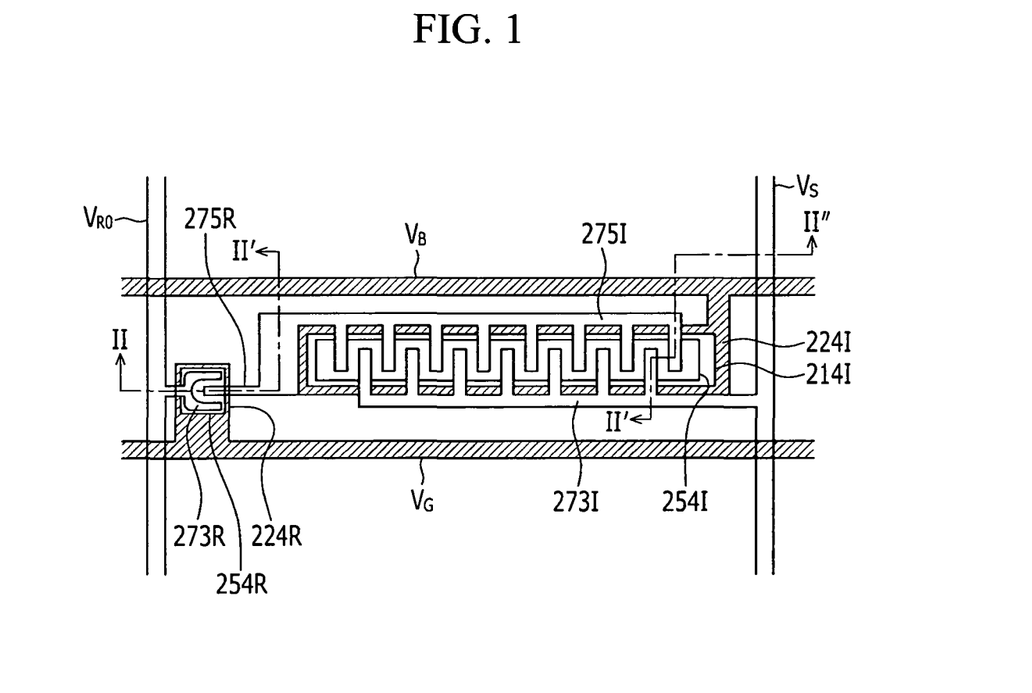
FIG. 1 is a top plan view of an exemplary embodiment of a display device according to the invention.
Figure 2:
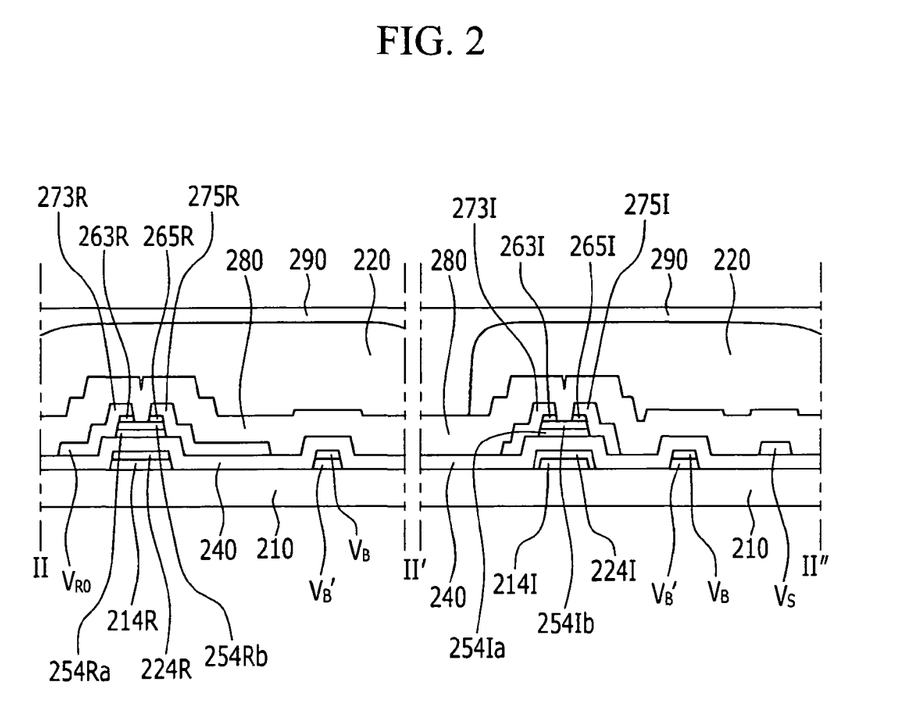
FIG. 2 is a cross-sectional view taken along line II-II' and line II'-II" of the display device of FIG. 1.

FIG. 1 is a top plan view of an exemplary embodiment of a display device according to the invention. FIG. 2 is a cross-sectional view taken along line II-II' and line II'-II" of the display device of FIG. 1.

Referring to FIGS. 1 and 2, an exemplary embodiment of a display device includes a power source line $V_B$ including a first gate electrode 224I and a gate line $V_G$ including a second gate electrode 224R on a first substrate 210 thereof.

The first gate electrode 224I is disposed overlapping a wide area compared with the second gate electrode 224R. The second gate electrode 224R has a shape that protrudes in a direction substantially perpendicular to a direction in which the gate line $V_G$ extends; however, the shape of the second gate electrode 224R is not limited thereto and may be variously changed.

Light blocking films 214I and 214R are disposed under the first gate electrode 224I and the second gate electrode 224R. The light blocking films 214I and 214R may include at least one of an organic material including a black pigment, amorphous silicon, amorphous silicon germanium and amorphous germanium, for example. In an exemplary embodiment, the light blocking films 214I and 214R includes amorphous silicon germanium ("a-SiGe"), and a ratio of silicon and germanium included in the light blocking films 214I and 214R may be about 1:3.

The light blocking films 214I and 214R block visible rays that are incident to the display device from outside such that a signal-to-noise ratio ("SNR") of the signal and the noise is improved and the influence of the visible rays is efficiently prevented by optimizing sensitivity of the semiconductor including amorphous silicon germanium or amorphous germanium to the infrared ray region.

The light blocking films 214I and 214R are in direct contact with the first gate electrode 224I and the second gate electrode 224R, respectively, such that an operation error of a transistor caused by the light blocking films 214I and 214R may be prevented. When the light blocking films 214I and 214R including the semiconductor material are separated from the first and second electrode 224I and 224R, the light blocking films 214I and 214R may absorb external light such that a minute charge may be generated, and an error of the transistor may be thereby generated. In an exemplary embodiment, the light blocking films 214I and 214R are in direct contact with the gate electrode to apply a voltage of a predetermined magnitude to the light blocking films 214I and 214R such that the operation error of the transistor due to the charges generated by the external light exposed to the light blocking films 214I and 214R is effectively prevented.

The light blocking film pattern $V_B'$ may be disposed under the power source line $V_B$. In an exemplary embodiment, a light blocking film material, the first gate electrode and the second gate electrode material may be sequentially formed and simultaneously patterned to form the structure shown in FIG. 2. In an alternative exemplary embodiment, the light blocking film pattern $V_B'$ may be omitted.

The first gate electrode 224I and the second gate electrode 224R may have an area greater than an area of the light blocking films 214I and 214R disposed thereunder.

A gate insulating layer 240 covering the first gate electrode 224I, the second gate electrode 224R, the gate line $V_G$ and the power source line $V_B$ is disposed on the first substrate 210. The gate insulating layer 240 may include silicon nitride (SiNx) or silicon oxide (SiOx).

A first semiconductor layer 254Ia and 254Ib and a second semiconductor layer 254Ra and 254Rb respectively overlapping the first gate electrode 224I and the second gate electrode 224R are disposed on the gate insulating layer 240. In an exemplary embodiment, each of the first semiconductor layer 254Ia and 254Ib and the second semiconductor layer 254Ra and 254Rb have a double-layered structure including first layers 254Ia and 254Ra including amorphous silicon and second layers 254Ib and 254Rb including amorphous silicon germanium. In such an embodiment, the ratio of silicon and germanium in the amorphous silicon germanium included in the second layers 254Ib and 254Rb may be about 1.66:1.

First and second source electrodes 273I and 273R and first and second drain electrodes 275I and 275R are disposed facing each other with reference to channels of the first semiconductor layers 254Ia and 254Ib and the second semiconductor layers 254Ra and 254Rb, respectively. The first source electrode 273I is connected to a source signal line $V_S$, and the second source electrode 273R is connected to a readout signal line $V_{RO}$. The first drain electrode 275I includes a portion facing the first source electrode 273I, and the second drain electrode 275R includes a portion facing the second source electrode 273R. The first drain electrode 275I is connected to the second drain electrode 275R.

The source signal line $V_S$ and the readout signal line $V_{RO}$ are extending substantially parallel to each other and intersecting the gate line $V_G$ and the power source line $V_B$.

The first gate electrode 224I, the first source electrode 273I and the first drain electrode 275I collectively define an infrared sensing transistor along with the first semiconductor layers 254Ia and 254I$b$, and the channel of the infrared sensing transistor is formed in the first semiconductor layer 254Ib between the first source electrode 273I and the first drain electrode 275I.

The second gate electrode 224R, the second source electrode 273R and the second drain electrode 275R collectively define a switching thin film transistor along with the second semiconductor layers 254Ra and 254Rb, and the channel of the switching thin film transistor is formed in the second semiconductor layer 254Rb between the second source electrode 273R and the second drain electrode 275R.

First ohmic contacts 263I and 263R may be disposed between the first semiconductor layer 254Ib and the first source electrode 273I and between the second semiconductor layer 254Rb and the second source electrode 273R, and second ohmic contacts 265I and 265R may be disposed between the first semiconductor layer 254Ib and the first drain electrode 275I and between the second semiconductor layer 254Rb and the second drain electrode 275R. In an exemplary embodiment, the first and second ohmic contacts may include a material such as n+ hydrogenated amorphous silicon doped with a high-concentration of n-type impurities such as phosphorous, or may include silicide.

In an exemplary embodiment, the infrared sensing transistor is only operated by light such that the power source line $V_B$ is constantly applied with a negative bias. In an exemplary embodiment, the first gate electrode 224I extending from the power source line $V_B$ functions as one electrode of a storage capacitor, and the first drain electrode 275I of the infrared sensing transistor overlapping the first gate electrode 224I in a wide area functions as the other electrode of the storage capacitor. In such an embodiment, the storage capacitor of the first gate electrode 224I and the first drain electrode 275I stores leakage current generated in the first semiconductor layers 254Ia and 254Ib by operation of the infrared sensing transistor.

A passivation layer 280, which is covering the first source electrode 273I, the second source electrode 273R, the first drain electrode 275I, the second drain electrode 275R, the channel of the infrared sensing transistor and the channel of the switching transistor, is disposed on the first substrate 210.

The passivation layer 280 is made of an inorganic insulator such as silicon nitride and silicon oxide. However, the passivation layer 280 may be made of an organic insulator and a surface thereof may be flat.

A light blocking member 220 overlapping the infrared sensing transistor and the switching transistor is disposed on the passivation layer 280. In an exemplary embodiment, the light blocking member 220 overlaps the first semiconductor layers 254Ia and 254Ib and the second semiconductor layers 254Ra and 254Rb. In an exemplary embodiment, the light blocking member 220 has infrared ray transmittance less than about 0.1% and optical density greater than about 4. In such an embodiment where the display device is a liquid crystal display, the light blocking member 220 having the characteristics described above prevents the light generated from a backlight from affecting the first semiconductor layers 254Ia and 254Ib such that the infrared sensing transistor is effectively prevented from being operated without a touch.

An overcoat 290 may be disposed on the light blocking member 220.

Hereinafter, an exemplary embodiment of a method of manufacturing the display device will be described with reference to FIGS. 3 and 4 and again to FIGS. 1 and 2.

Figure 3:
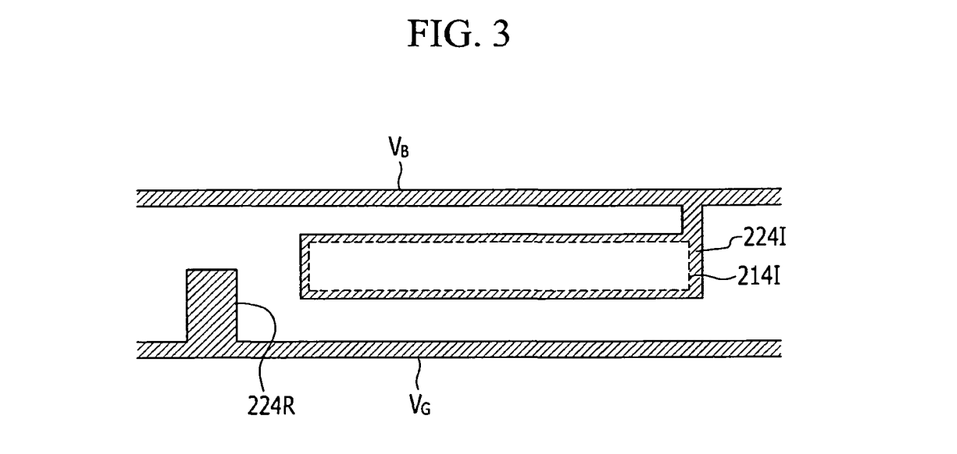
FIG. 3 and FIG. 4 are top plan views showing an exemplary embodiment of a method of manufacturing the display device of FIG. 1.
Figure 4:
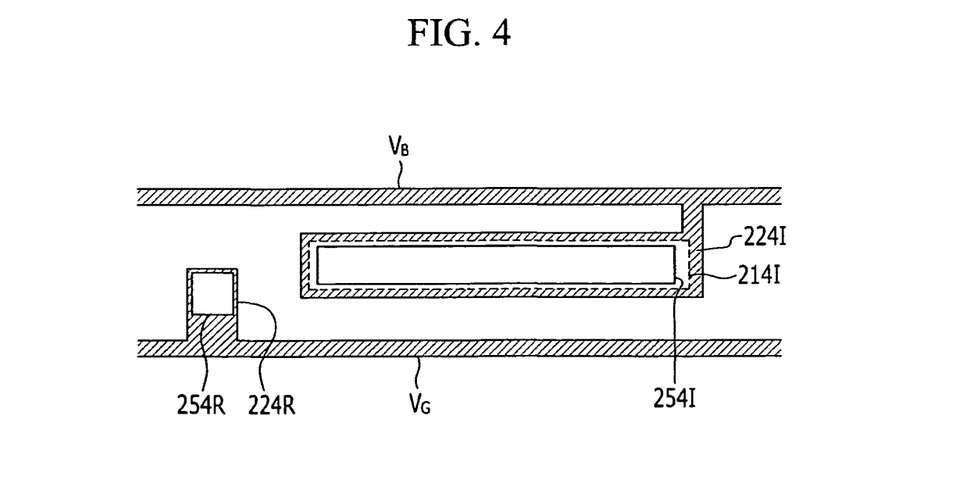

FIGS. 3 and 4 are top plan views showing an exemplary embodiment of a method of manufacturing the display device of FIG. 1.

Referring to FIGS. 2 and 3, a light blocking material is formed, e.g., coated, on the first substrate 210 and patterned to form the light blocking film 214I on the first substrate 210. The light blocking material may be a semiconductor material, particularly, amorphous silicon germanium ("a-SiGe"). In such an embodiment, a conductive material is formed, e.g., coated, on the first substrate 210 and patterned to form the power source line $V_B$ and a gate line $V_G$ extending in a transverse direction. The power source line $V_B$ includes the first gate electrode 224I protruding therefrom and overlapping the light blocking film 214I, and the gate line $V_G$ includes the second gate electrode 224R protruding therefrom.

In such an embodiment, a gate insulating layer 240 is formed on the first substrate 210 covering the first gate electrode 224I, the second gate electrode 224R, the gate line $V_G$ and the power source line $V_B$. The gate insulating layer 240 may include silicon nitride (SiNx) or silicon oxide (SiOx).

Referring to FIG. 4, a first semiconductor material and a second semiconductor material are sequentially formed, e.g., deposited, and patterned on the first substrate 210. In an exemplary embodiment, the first semiconductor material may be amorphous silicon and the second semiconductor material may be amorphous silicon germanium.

In an exemplary embodiment, the first semiconductor material and the second semiconductor material are patterned by the same mask to form a first semiconductor layer 254I and a second semiconductor layer 254R. In an embodiment, the first semiconductor layer 254I overlaps the first gate electrode 224I, and the second semiconductor layer 254R overlaps the second gate electrode 224R.

The first semiconductor layer 254I and the second semiconductor layer 254R have a double-layered structure including the first layers 254Ia and 254Ra including amorphous silicon and the second layers 254Ib and 254Rb disposed on the first layers 254Ia and 254Ra and including amorphous silicon germanium.

The first semiconductor layer 254I has an area less than an area of the light blocking film 214I disposed thereunder.

In an exemplary embodiment, a conductive material is formed, e.g., coated, on the first substrate 210 and patterned to form the readout signal line $V_{RO}$ and the source signal line $V_S$ extending in a longitudinal direction. The readout signal line $V_{RO}$ and the source signal line $V_S$ intersect the gate line $V_G$ and the power source line $V_B$.

In such an embodiment, the first source electrode 273I connected to the source signal line $V_S$ is formed on the first semiconductor layer 254I. The first source electrode 273I may have a bar-shaped portion protruding from the source signal line $V_S$, and a plurality of source electrode units protruding from the bar-shaped portion. The first drain electrode 275I including a plurality of drain electrode units facing the plurality of source electrode units is formed on the first semiconductor layer 254I.

The second source electrode 273R connected to the readout signal line $V_{RO}$ and having a curved-shaped portion, e.g., a U-shaped portion, is formed on the second semiconductor layer 254R, and the second drain electrode 275R facing the second source electrode 273R with reference to the second semiconductor layer 254R is formed on the second semiconductor layer 254R. In such an embodiment, the first drain electrode 275I and the second drain electrode 275R are connected.

According to the method described above, the display device shown in FIGS. 1 and 2 may be manufactured.

Figure 5:
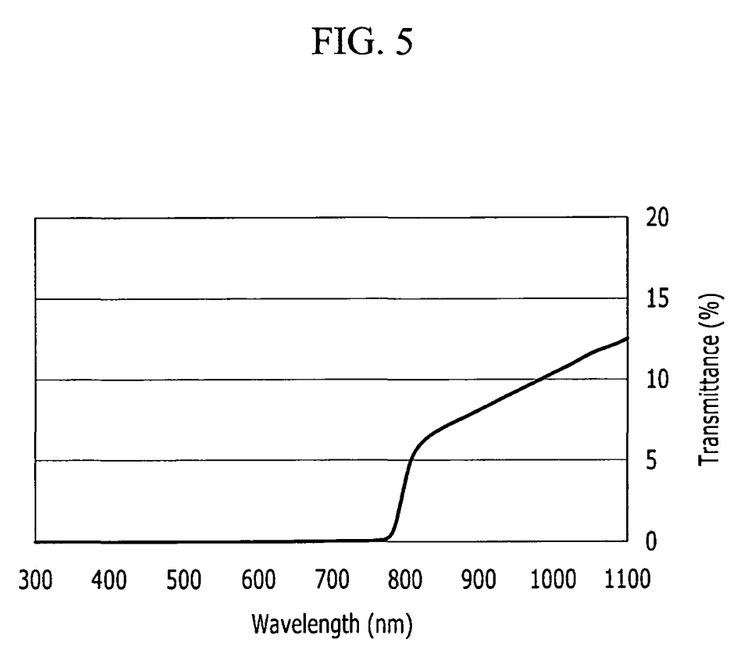
FIG. 5 is a graph showing transmittance (percent: %) versus wavelength (nanometer: nm) of a light blocking member used in a conventional liquid crystal display.
Figure 6:
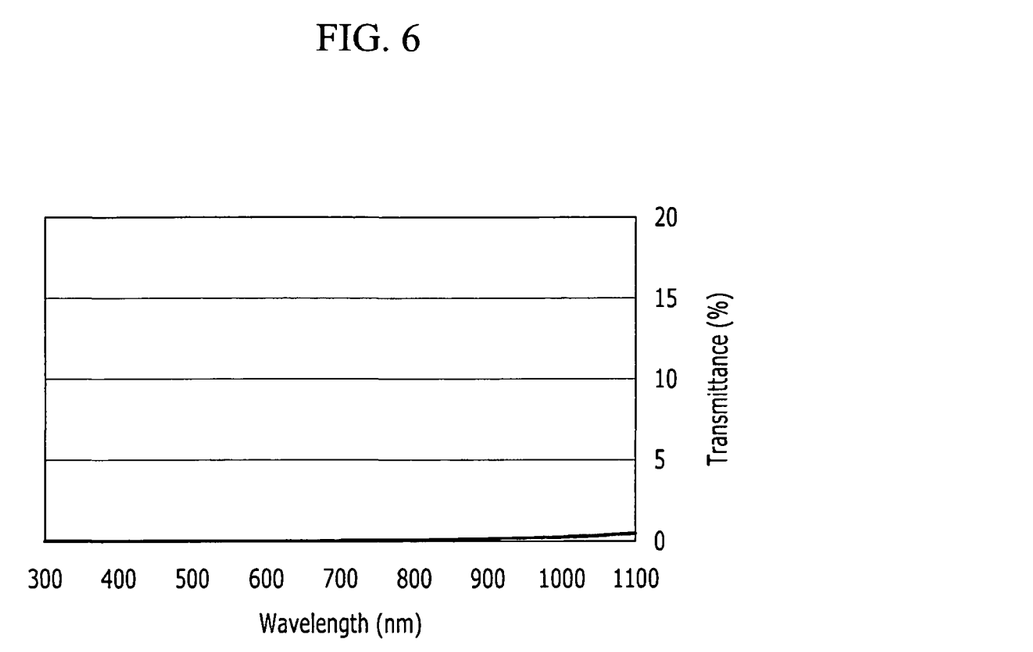
FIG. 6 is a graph showing transmittance (%) versus wavelength (nm) of a light blocking member in an exemplary embodiment of a liquid crystal display according to the invention.

FIG. 5 is a graph showing transmittance (percent: %) versus wavelength (nanometer: nm) of a light blocking member used in a conventional liquid crystal display, and FIG. 6 is a graph showing transmittance (%) versus wavelength (nm) of a light blocking member used in an exemplary embodiment of a liquid crystal display according to the invention.

Referring to FIG. 5, a black matrix generally used as the light blocking member has infrared ray transmittance greater than about 6.9%. Referring to FIG. 6, a black matrix used as the light blocking member in an exemplary embodiment includes a material having infrared ray transmittance less than about 0.1% and optical density greater than about 4. In an exemplary embodiment, a top gate typically used to block the light incident to the infrared sensing transistor from the backlight may be replaced with the light blocking member of FIG. 6.

Figure 7:
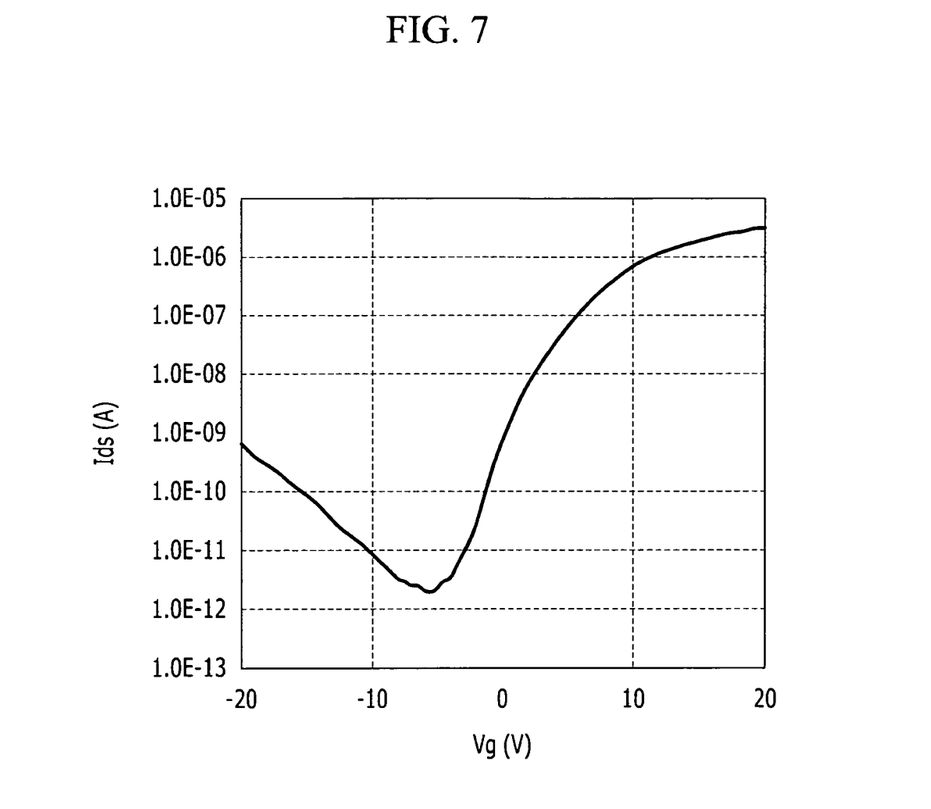
FIG. 7 is a graph showing current (ampere; A) versus voltage (volt: V) in an infrared sensing transistor of an exemplary embodiment of a display device according to the invention.

FIG. 7 is a graph showing current (ampere: A) versus voltage (volt: V) in an infrared sensing transistor of an exemplary embodiment of a display device according to the invention.

Referring to FIG. 7, in an exemplary embodiment, where the semiconductor layer has a double-layered structure of amorphous silicon and amorphous silicon germanium, charge mobility is about 0.2 square centimeters per volt second ($cm^2/Vs$). In such an embodiment, the semiconductor layer may be used in a switching transistor.

Figure 8:
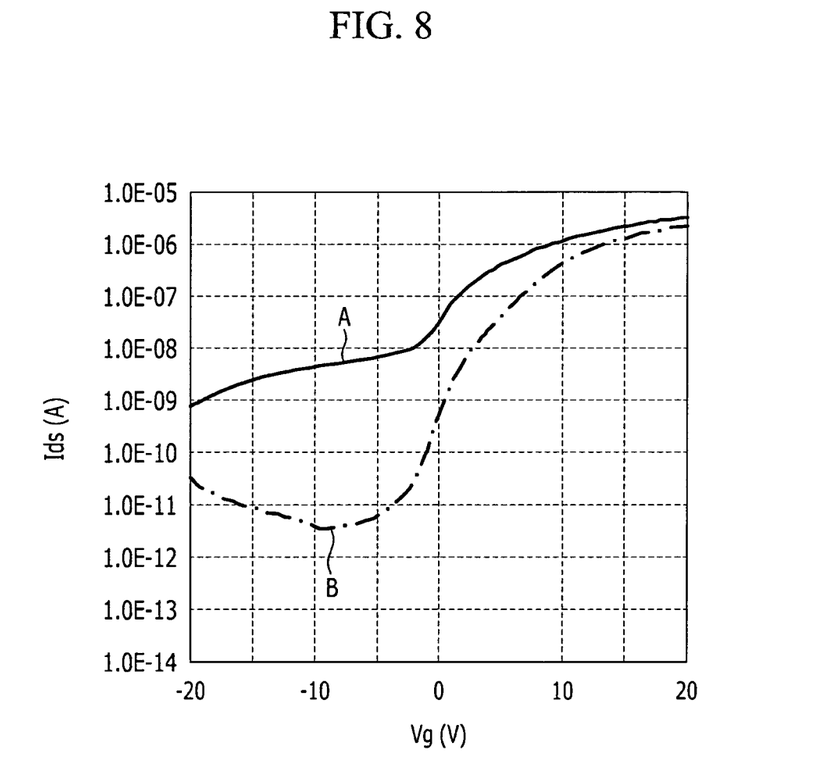
FIG. 8 is a graph showing current (A) versus voltage (V) to show infrared ray sensitivity of an infrared sensing transistor used in an exemplary embodiment of a display device according to the invention.

FIG. 8 is a graph showing current (A) versus voltage (V) to show infrared ray sensitivity of an infrared sensing transistor used in an exemplary embodiment of a display device according to the invention.

Referring to FIG. 8, in an exemplary embodiment, where the semiconductor layer have a double-layered structure of amorphous silicon and amorphous silicon germanium, infrared ray sensitivity represented by a ratio of the line A measured when a touch exits and the line B measured when a touch does not exist is greater than about 630. Accordingly, the semiconductor layer may be used as the infrared sensing transistor.

Figure 9:
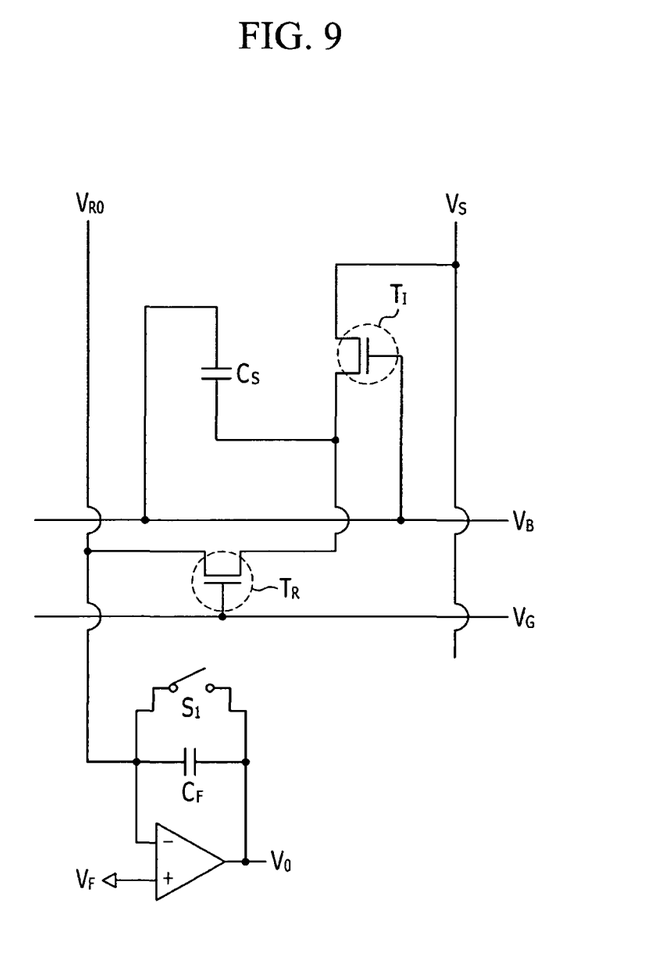
FIG. 9 is a circuit diagram showing an exemplary embodiment of a display device according to the invention.

FIG. 9 is a circuit diagram of an exemplary embodiment of a display device according to the invention.

Referring to FIG. 9, a circuit connection relation in the exemplary embodiment shown in FIGS. 1 and 2 will now be described.

When a switching transistor $T_R$ is turned on, a difference between a voltage $V_F$ applied from the readout signal line $V_{RO}$ and a voltage applied from the power source line $V_B$ is charged to a storage capacitor $C_S$.

When the switching transistor $T_R$ is turned off and the infrared rays inflow by a touch on the display device such that the light leakage current is generated in the infrared sensing transistor, a voltage drop is generated at one electrode of the storage capacitor $C_S$ that is charged with the voltage $V_F$. In such an embodiment, the voltage at one electrode of the storage capacitor $C_S$ is dropped to the voltage level applied from the source signal line $V_S$. When the touch does not exist, that is, when the infrared sensing transistor is not operated, the voltage drop of the storage capacitor $C_S$ is not generated.

When the switching transistor $T_R$ is again turned on and the touch exists, the storage capacitor $C_S$ is recharged. When the storage capacitor $C_S$ is recharged, the current is generated in the readout signal line and the generated current is charged to a capacitor $C_F$ included in an operational amplifier. The touch is recognized by the change of the voltage $V_O$ based on the voltage change of the capacitor of the operational amplifier. In such an embodiment, when the touch does not exist, the voltage is not charged to the storage capacitor $C_S$.

Here, the voltage applied to the source signal line $V_S$ and the voltage applied to the power source line $V_B$ may be a negative direct current ("DC") voltage, and the voltage $V_F$ applied from the readout signal line $V_{RO}$ may be a positive DC voltage.

Figure 10:
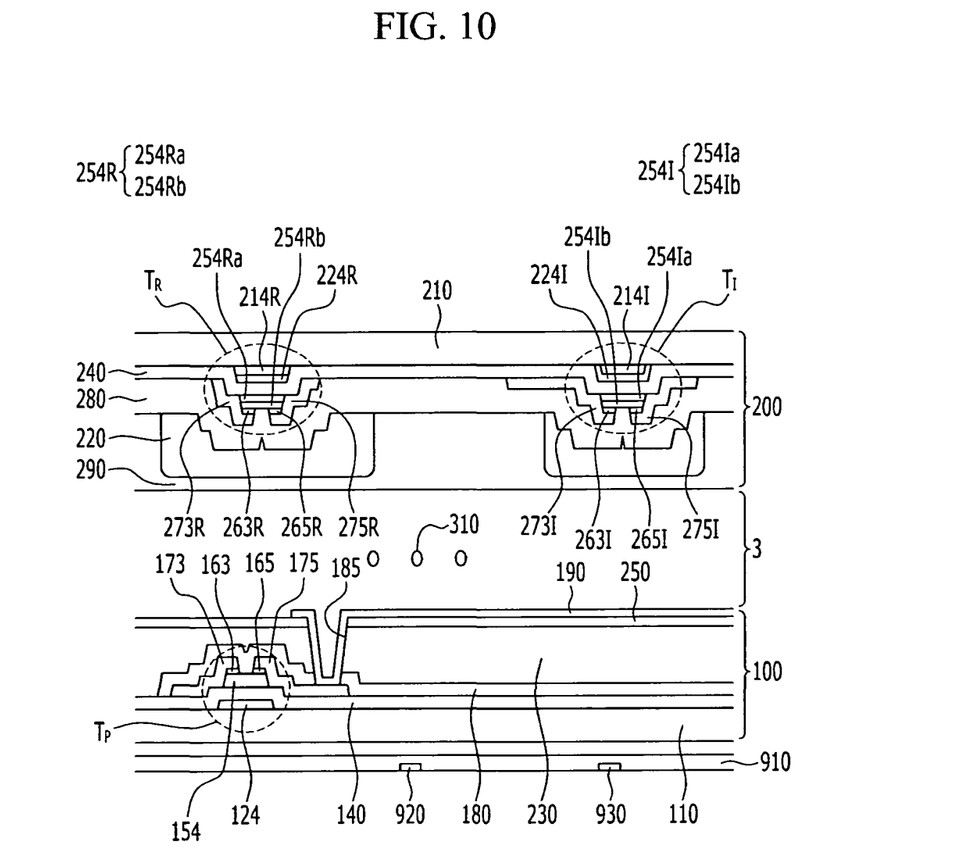
FIG. 10 is a cross-sectional view of an alternative exemplary embodiment of a liquid crystal display according to the invention.

FIG. 10 is a cross-sectional view of an alternative exemplary embodiment of a liquid crystal display according to the invention.

FIG. 10 shows an exemplary embodiment where the display device including the infrared sensing transistor shown in FIGS. 1 and 2 is a liquid crystal display.

Referring to FIG. 10, an exemplary embodiment of a display device includes an upper panel 200 having an infrared sensing transistor $T_I$ and a switching transistor $T_R$, a lower panel 100 facing the upper panel 200, and a liquid crystal layer 3 between the lower and upper display panels 100 and 200.

The upper panel 200 of FIG. 10 is substantially similar to the panel shown in FIG. 2, and any repetitive detailed description thereof will hereinafter be omitted or simplified.

The liquid crystal layer 3 may have negative dielectric anisotropy, and liquid crystal molecules 310 of the liquid crystal layer 3 may be aligned such that a longitudinal axis thereof is substantially perpendicular to surfaces of the lower and upper panels 100 and 200 when an electric field is not generated therein.

Alignment layers (not shown) may be disposed on inner surfaces of the lower and upper display panels 100 and 200, and the alignment layers may be vertical alignment layers.

In an exemplary embodiment, the display device may further include a lower polarizer (not shown) disposed under the lower panel 100 and an upper polarizer (not shown) disposed on the upper panel 200. In such an embodiment, intensity of the light provided to the lower panel 100 and the upper panel 200 may be controlled based on a polarization characteristic of the lower polarizer and the upper polarizer.

In an exemplary embodiment, the display device may further include a backlight unit 910 disposed under the lower panel 100. The backlight unit 910 may include at least one infrared ray emitting member 920 and at least one visible ray emitting member 930. The infrared ray emitting member 920 and the visible ray emitting member 930 may be a point light source such as a light-emitting device ("LED"). The infrared rays and the visible rays, emitted from the infrared ray emitting member 920 and the visible ray emitting member 930, respectively, may be incident substantially perpendicular to the lower panel 100.

The infrared ray emitting member 920 and the visible ray emitting member 930 may be substantially uniformly distributed on an entire portion of the backlight unit 910 to provide the infrared rays and the visible rays on the entire region of the backlight unit 910.

In one exemplary embodiment, for example, the infrared ray emitting member 920 and the visible ray emitting member 930 may be alternately arranged. In an alternative exemplary embodiment, the infrared ray emitting member 920 and the visible ray emitting member 930 may be disorderly arranged, or may be arranged in a predetermined ratio.

A lower panel 100 includes a second substrate 110 including a material, such as transparent glass or plastic, and a pixel transistor $T_P$.

The pixel transistor $T_P$ may include a gate electrode 124 disposed on the second substrate 110, a gate insulating layer 140 covering the second substrate 110 and the gate electrode 124, a semiconductor layer 154 overlapping the gate electrode 124 on the gate insulating layer 140, first and second ohmic contact layers 163 and 165 disposed on the semiconductor layer 154, a source electrode 173 disposed on the first ohmic contact layer 163, and a drain electrode 175 facing the source electrode 173 on the second ohmic contact layer 165

In an exemplary embodiment, the lower panel 100 further includes a gate line disposed on the second substrate 110 and a data line intersecting the gate line. In such an embodiment, the gate line may be connected to the gate electrode 124 of the pixel transistor $T_P$. In such an embodiment, the data line may be connected to the source electrode 173 of the pixel transistor $T_P$.

The lower panel 100 may further include a passivation layer 180 covering the pixel transistor $T_P$, a color filter 230 disposed on the passivation layer 180, an overcoat 250 disposed on the color filter 230 and a pixel electrode 190 disposed on the overcoat 250. In an exemplary embodiment, the pixel electrode 190 is connected to the drain electrode 175 of the pixel transistor Tp through a contact hole 185 formed through the overcoat 250 and the passivation layer 180.

An exemplary embodiment of a method of sensing an object on the display device of FIG. 10 will now be described.

As shown in FIG. 10, the infrared rays generated from the backlight unit 910 are sequentially passing through the lower panel 100, the liquid crystal layer 3 and the upper panel 200. When a touch by an object, e.g., a finger, occurs on the display device, the infrared rays emitted from the display device are reflected by the object, and the reflected infrared rays are incident to the infrared sensing transistor $T_I$ disposed on the upper panel 200 to be sensed. Accordingly, the touch sensing of the finger is executed such that information such as existence of the contact by the object and a contact position may be obtained.

In an exemplary embodiment, the display device includes the switching transistor and the infrared sensing transistor having double-layered structure of amorphous silicon and amorphous silicon germanium, such that the switching transistor, as an addressing transistor has high mobility and high on/off ratio, and the switching transistor and the phototransistor may be formed at a same process.

In an exemplary embodiment of the display device according to the invention, the number of contact holes may be substantially reduced such that the manufacturing cost may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising: a first substrate;
an infrared sensing transistor disposed on the first substrate;
a readout transistor connected to the infrared sensing transistor and which transmits a detecting signal; and
a light blocking member disposed on the infrared sensing transistor and directly on the first substrate,
wherein the infrared sensing transistor comprises:
a light blocking film disposed on the first substrate;
a first gate electrode directly contacting the light blocking film and disposed directly on the light blocking film, the light blocking film interposed between the first gate electrode and the first substrate;
a first semiconductor layer disposed on the first gate electrode overlapping the light blocking film, and the first gate electrode interposed between and overlapping the light blocking film and the first semiconductor;
a first source electrode disposed on the first semiconductor layer; and
a first drain electrode disposed on the first semiconductor layer, wherein the readout transistor comprises:
a second gate electrode disposed on the first substrate;
a second semiconductor layer disposed on the second gate electrode overlapping the second gate electrode;
a second source electrode disposed on the second semiconductor layer; and
a second drain electrode disposed on the second semiconductor layer,
wherein the first gate electrode of the infrared sensing transistor is connected to a power source line,
wherein the power source line and the first gate electrode are disposed at a same layer, and
wherein the light blocking member overlaps the first semiconductor layer and the light blocking film and covers the first semiconductor layer entirely.

2. The display device of claim 1, wherein
a storage capacitor is defined by the first gate electrode and the first drain electrode overlapping the first gate electrode, and
the storage capacitor stores a leakage current generated in the first semiconductor layer.

3. The display device of claim 2, wherein
the first drain electrode is directly connected to the second drain electrode.

4. The display device of claim 3, further comprising:
a gate line connected to the second gate electrode.

5. The display device of claim 4, wherein
the power source line and the gate line are disposed at a same layer.

6. The display device of claim 5, wherein
the power source line applies a negative bias voltage to the first gate electrode.

7. The display device of claim 1, wherein each of the first semiconductor layer and the second semiconductor layer comprises:
a first layer including amorphous silicon; and
a second layer including amorphous silicon germanium and disposed on the first layer.

8. The display device of claim 7, wherein
the first semiconductor layer and the second semiconductor layer are disposed at a same layer.

9. The display device of claim 8, further comprising:
a source signal line connected to the first source electrode.

10. The display device of claim 9, further comprising:
a readout signal line connected to the second gate electrode.

11. The display device of claim 10, further comprising:
an operational amplifier connected to the readout signal line.

12. The display device of claim 1, wherein
the light blocking film comprises amorphous silicon germanium.

13. The display device of claim 1, wherein
the light blocking member has infrared ray transmittance less than about 0.1%.

14. The display device of claim 13, wherein
the light blocking member has optical density greater than about 4.

15. The display device of claim 1, further comprising:
a second substrate disposed opposite to the first substrate; and
a pixel transistor disposed on the second substrate.

16. A method of manufacturing a display device, the method comprising:
forming a light blocking film directly on a first substrate;
forming a power source line, a first gate electrode directly contacting the light blocking film, a gate line, and a second gate electrode on the first substrate after forming the light blocking film directly on the first substrate, the light blocking film is directly interposed between the first gate electrode and the first substrate;
forming a gate insulating layer covering the first gate electrode, the second gate electrode, the power source line and the gate line;
forming a first semiconductor layer corresponding to the first gate electrode, the first gate electrode interposed between and overlapping the light blocking film and the first semiconductor, and forming a second semiconductor layer corresponding to the second gate electrode on the gate insulating layer;
forming a first source electrode and a first drain electrode facing each other on the first semiconductor layer, forming a second source electrode and a second drain electrode facing each other on the second semiconductor layer, forming a source signal line connected to the first source electrode, and forming a readout signal line connected to the second source electrode;
forming a passivation layer covering the first source electrode, the first drain electrode, the second source electrode and the second drain electrode; and forming a light blocking member on the first substrate disposed on the passivation layer, overlapping the first semiconductor layer and the light blocking film, and covering the first semiconductor layer entirely.

17. The method of claim 16, wherein
the first drain electrode is directly connected to the second drain electrode.

18. The method of claim 17, wherein
the gate line and the power source line are formed at a same layer.

19. The method of claim 18, wherein
each of the first semiconductor layer and the second semiconductor layer is formed by sequentially depositing a first layer including amorphous silicon and a second layer including amorphous silicon germanium.

20. The method of claim 19, wherein
the first semiconductor layer and the second semiconductor layer are formed at a same process.

21. The display device of claim 1, wherein the light blocking film is disposed directly on the first substrate.

22. The method of claim 16, wherein
the light blocking film is disposed directly on the first substrate.

23. The method of claim 16 further comprising:
forming a second substrate disposed opposite to the first substrate; and
forming a pixel transistor disposed on the second substrate.

24. The method of claim 23 wherein the light blocking member is formed directly on the passivation layer, both being disposed on the first substrate.

25. The display device of claim 1, further comprising a storage capacitor, wherein one electrode of the storage capacitor is connected to the first drain electrode and the other electrode of the storage capacitor is connected to the first gate electrode and the power source line.

26. The method of claim 16, wherein the display device comprises a storage capacitor, and wherein one electrode of the storage capacitor is connected to the first drain electrode and the other electrode of the storage capacitor is connected to the first gate electrode and the power source line.

* * * * *